United States Patent [19]
Eaton

[11] 3,944,798
[45] Mar. 16, 1976

[54] METHOD AND APPARATUS FOR MEASURING DIRECTION

[75] Inventor: Homer L. Eaton, Balboa, Calif.

[73] Assignee: Eaton-Leonard Corporation, Santa Ana, Calif.

[22] Filed: Apr. 18, 1974

[21] Appl. No.: 461,881

[52] U.S. Cl...... 235/151.3; 235/61.6 R; 33/174 PC; 33/1 M; 33/1 N
[51] Int. Cl.² .................. G01B 3/56; G01B 7/28
[58] Field of Search......... 33/1 M, 1 N, 1 PT, 1 CC, 33/1 MP, 174 PC; 235/151.3, 61.6 A, 61.6 B, 61.6 R, 151.11, 92 DN, 151.32; 250/237

[56] References Cited
UNITED STATES PATENTS

| | | | |
|---|---|---|---|
| 3,226,833 | 1/1966 | Lemelson | 33/143 |
| 3,246,128 | 4/1966 | Albrecht et al. | 235/61.6 A X |
| 3,267,251 | 8/1966 | Anderson | 235/61.6 A X |
| 3,346,724 | 10/1967 | Fuhremister et al. | 235/61.6 |
| 3,410,956 | 11/1968 | Grossimon et al. | 235/61.6 A X |
| 3,515,888 | 2/1970 | Lewis | 235/151.34 X |
| 3,531,868 | 10/1970 | Stevenson | 33/174 |
| 3,567,950 | 3/1971 | Meyer | 33/1 X |
| 3,571,934 | 3/1971 | Buck | 33/174 |
| 3,601,590 | 8/1971 | Norton | 235/151.11 X |
| 3,609,322 | 9/1971 | Burnett et al. | 235/151.11 |

Primary Examiner—Edward J. Wise

[57] ABSTRACT

Measurement of a vector inn space is accomplished by an articulated five axis probe carrying a working head that can be moved into a measuring position that has a known angular relation to an object to be measured. A plurality of pivotally interconnected links include a first link pivotally mounted to a work table and an end link that fixedly carries a working head having a V-groove defined by four mutually spaced electrically conductive contact elements. For measurements made upon a tube having a number of bends, the working head is successively positioned in contact with the several straight portions of the bent tube and the angles of the several links relative to adjacent links and relative to the work table are read out for each contact. When the working head is properly oriented with respect to the tube, the electrical contacts enable read out of the several angles. These collectively define both the direction of the working head and its coordinate position with respect to a reference coordinate system. The measured angles, together with lengths of the several links, are employed to calculate direction angles and coordinate position of vectors coaxial with each tube straight portion.

47 Claims, 17 Drawing Figures

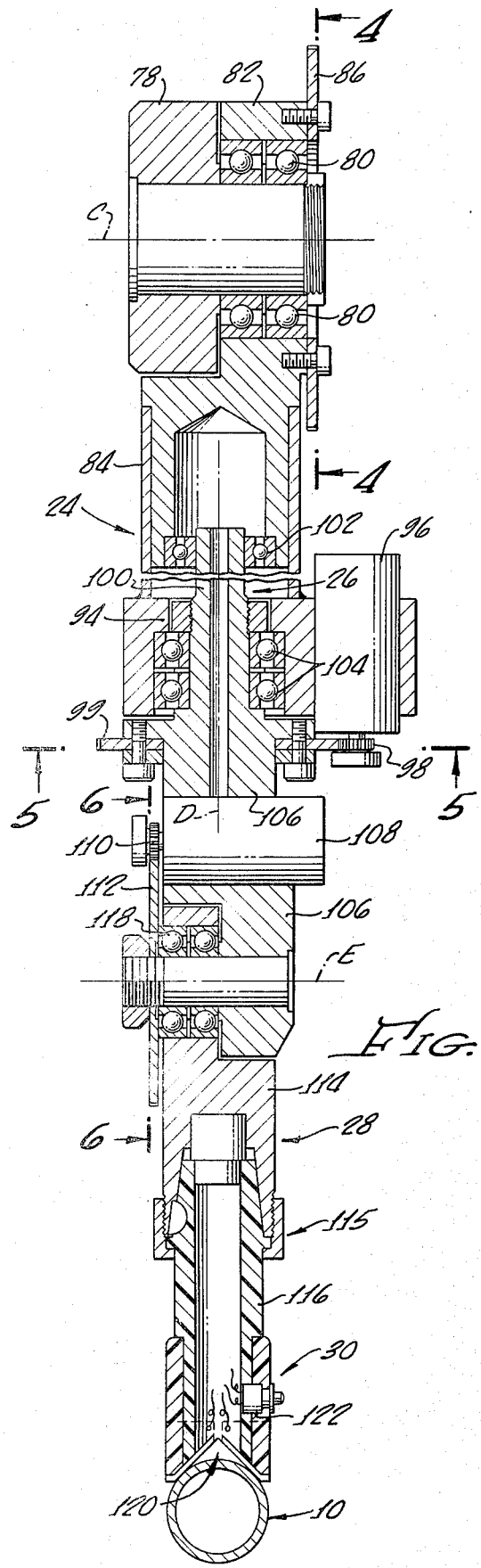
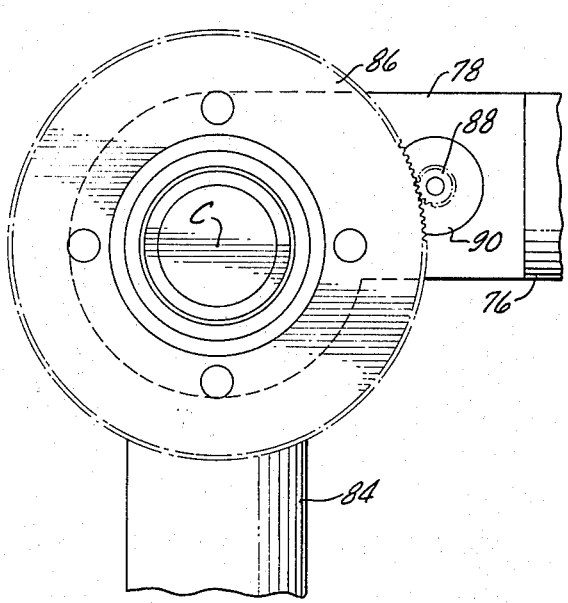
FIG. 4.
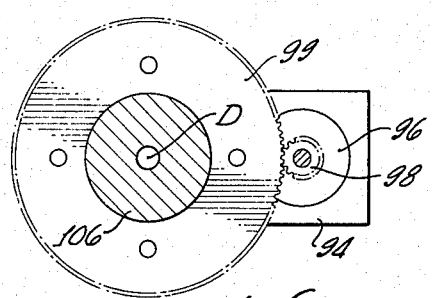
FIG. 5.
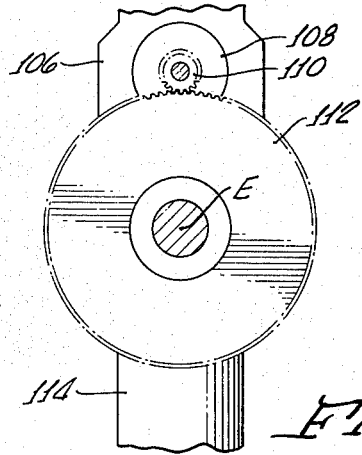
FIG. 3.
FIG. 6.

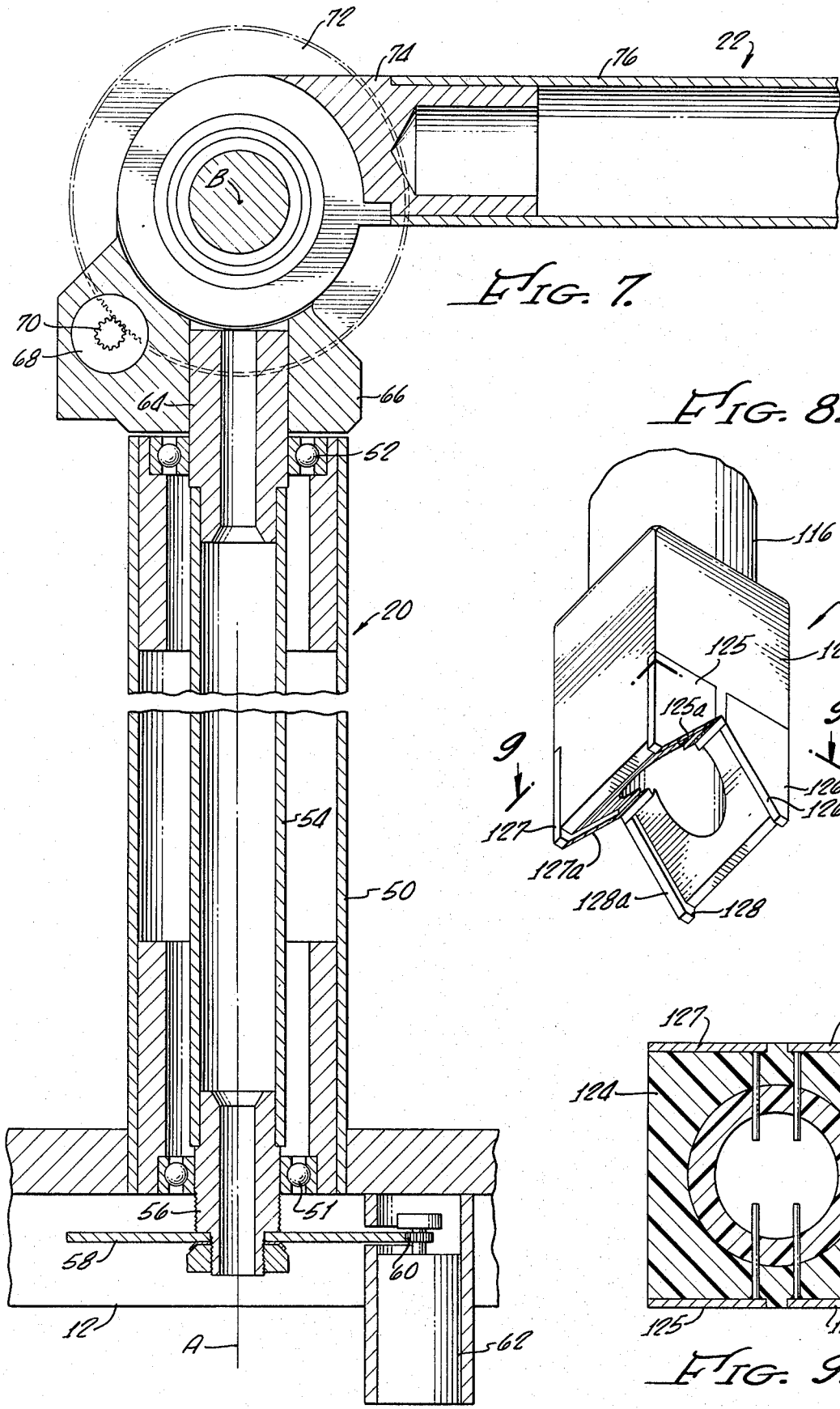

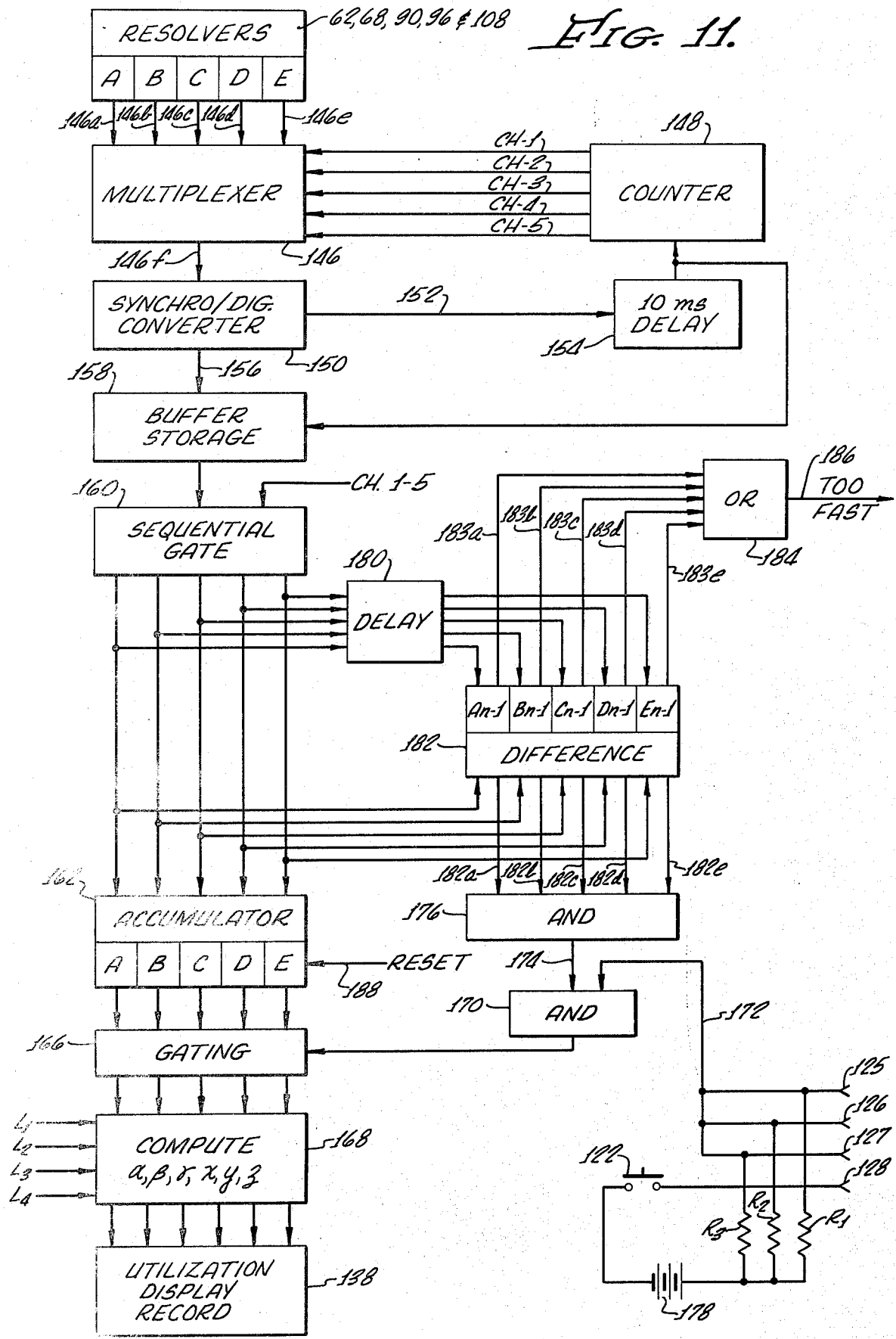

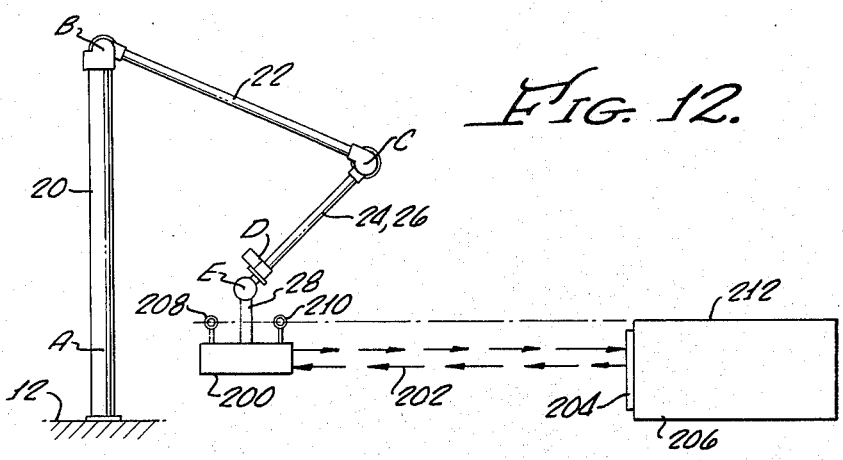
FIG. 12.
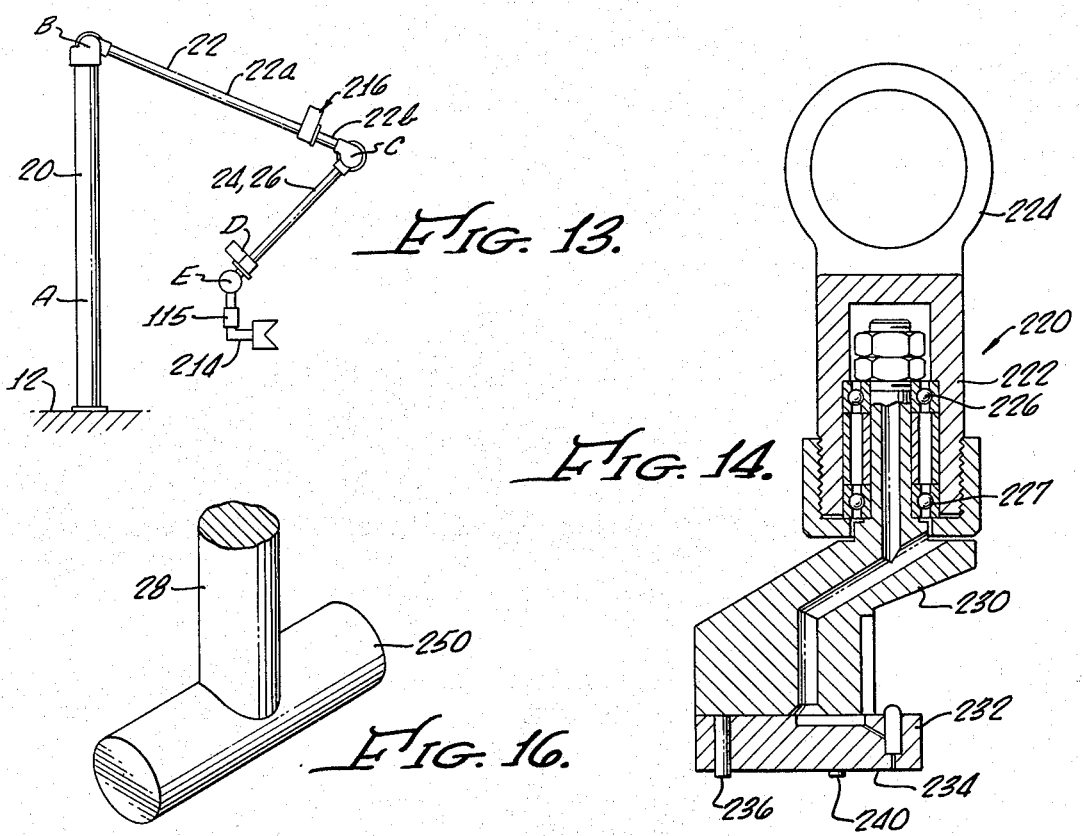
FIG. 13.
FIG. 14.
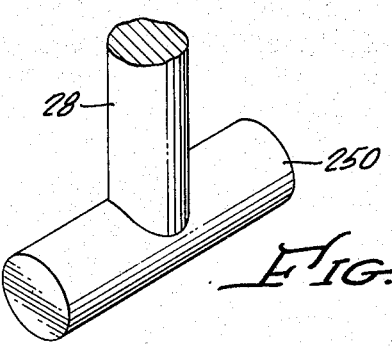
FIG. 16.
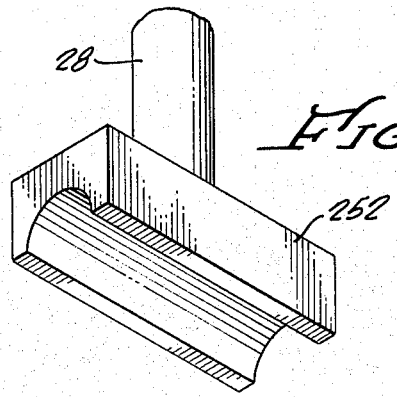
FIG. 17.
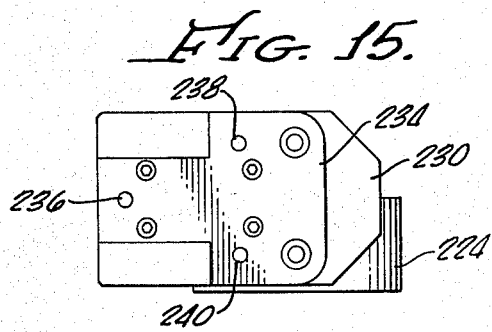
FIG. 15.

METHOD AND APPARATUS FOR MEASURING DIRECTION

BACKGROUND OF THE INVENTION

1. Field of the Invention:

The present invention relates to measurement of positions of objects, and more particularly concerns measurement of angular relations. Methods and apparatus of this invention may be employed for measurements of vectors, that is, the measurement of either one or both of the direction and coordinate position of a vector with respect to a reference system.

2. Description of Prior Art

Position measuring instruments are employed in a wide variety of manufacturing, assembly and inspection operations. Generally, one or a number of different points on an object to be measured are contacted by a probe that is movable with respect to a reference coordinate system. Most commonly, the probe is mounted for translational motion along three coordinate axes as, for example, in the machines shown in U.S. Pat. Nos. 3,774,311 to Stemple and 3,774,312 to Esch. These machines are of limited application because the size of the machine itself determines the size of the object that may be measured, and costs increase rapidly with increasing size. Because of the difficulties of maintaining precision of position and motion in traveling over long cantilevered elements, such devices must be exceedingly massive for required rigidity. Further, they often require complex techniques such as the impressed vibratory movement of the Esch patent or unique and expensive bearing structures of the Stemple patent for obtaining desired precision. Even so, such machines measure only a point, by determining its coordinates. Therefore, two separate and independent measurements at spaced points are needed for measuring direction. Further, if the angular relation of a planar surface is to be measured, as for example, in determining a normal to a surface, machines of the prior art require three separate measurements to define the plane.

The U.S. Pat. to Bower, No. 2,906,179, describes a coordinate position measuring gauge comprising several pivotally interconnected links of adjustable length. Although the Bower gauge is illustrated in connection with a closed loop control system for a machining tool, it still can provide information defining solely the coordinate position of a single point for any given measurement.

In the prior art of measuring instruments, optical devices have been employed for alignment of parts or, in effect, measuring direction. Thus, an autocollinator, such as shown in U.S. Pat. No. 3,024,365 to Smith et al has been employed for remote measurement of the orientation of a reflective surface, as used for example, in the alignment of an autonavigator. However, such optical devices, like theodolites and precision transits, require careful and exact positioning or setup to achieve a predetermined and therefore, fixed position of alignment. For measurement of some second or different direction such optical measuring or alignment devices must be moved and the precision instrument setup carefully re-established prior to a second measurement.

In various types of tube bending machines, such as in that described in the U.S. Pat. to Hill No. 3,145,756, or that described in the U.S. Pat. to Hautau No. 3,299,681, various measurements must be made upon the straight portions (straights) of bent tubes to obtain information for computation of machine bending commands or to obtain information for making various corrections to the tube machine bending commands. As shown in the British Pat. No. 1,329,708 to McMurtry, for example, bent tubes or pipes are made from previously bent master pipes, employing a three-axis coordinate point measuring gauge which measures the position of two stations on each straight portion of the tube in cartesian coordinates. The working head of this coordinate point measuring machine, much like the working head of other three axis measuring machines, will contact a point on the object to be measured but does not attain any predetermined angular position or direction with respect to the object to be measured. Therefore, it is not possible to measure a vector or direction without making several measurements.

Accordingly, it is an object of the present invention to enable measurement of direction of a line having a fixed angular relation with respect to an object.

SUMMARY OF THE INVENTION

In carrying out the principles of the present invention in accordance with a preferred embodiment thereof, direction of a line having a known angular relation to an object is measured by translating and angularly displacing a working head from a reference direction about a plurality of axes of rotation until the working head attains a measuring position having a predetermined angular relation to the object, and measuring the angular displacement of the working head about each of the axes. In a particular embodiment of the invention, a working head is adapted to be moved to a number of different angular positions by means of an articulated arm mounting the head to a support and electrical signals are generated that collectively define the angular position of the working head with respect to a reference direction. The angles of articulation of the articulated arm, together with lengths of the different sections of the arm, are employed to calculate direction cosines of the working head itself with respect to a reference coordinate system. The arrangement also enables calculation of the coordinate position of a point on a working head with respect to such reference coordinate system, or both such coordinate position and direction cosines.

BRIEF DESCRIPTION OF THE DRAWINGS

FIG. 3 is a section taken on line 3—3 of FIG. 1;

FIGS. 4, 5 and 6 are sections taken on lines 4—4, 5—5, and 6—6 respectively of FIG. 3;

FIG. 7 is a line section taken on line 7—7 of FIG. 1;

FIG. 8 is a perspective view of one form of working head;

FIG. 9 is a section taken on line 9—9 of FIG. 8;

FIG. 11 is a block diagram showing further details of angle sensor readout and computation;

FIG. 12 illustrates a five-axis measuring instrument having an optical working head;

FIG. 13 illustrates a measuring instrument with a replacable working head and six axes;

FIGS. 14 and 15 show a working head specifically adapted for measuring directions of planar surfaces; and FIGS. 16 and 17 illustrate still other forms of working heads.

GENERAL PRINCIPLES

The method and apparatus of the present invention are applicable to measurement in a multitude of diverse applications wherein it is desired to determine the direction and/or the position of the vector. Measurement of a vector may be employed in positioning and locating parts and devices used in assembly to ensure proper orientation. Measurement of a vector may be employed to originate manufacturing data by measuring directions and positions of a sample shape such as a sample bent pipe, for example. Direction measurements may be employed for inspection of completed parts and may be employed for making measurements on parts of varying linear, curved and planar shapes, and for comparing such measurements with pre-described measurements contained in a drawing or other computation.

An important application of the present invention, an application for which a working embodiment has been initially employed, is the measurement of a sample bent tube for the purpose of deriving data to enable the subsequent bending of other tubes conforming to the sample. Accordingly, the invention will be described as embodied in this initial mechanization although it will be readily appreciated that principles of the invention may be readily employed in any of a number of applications whether or not specifically mentioned herein.

Figure 1:
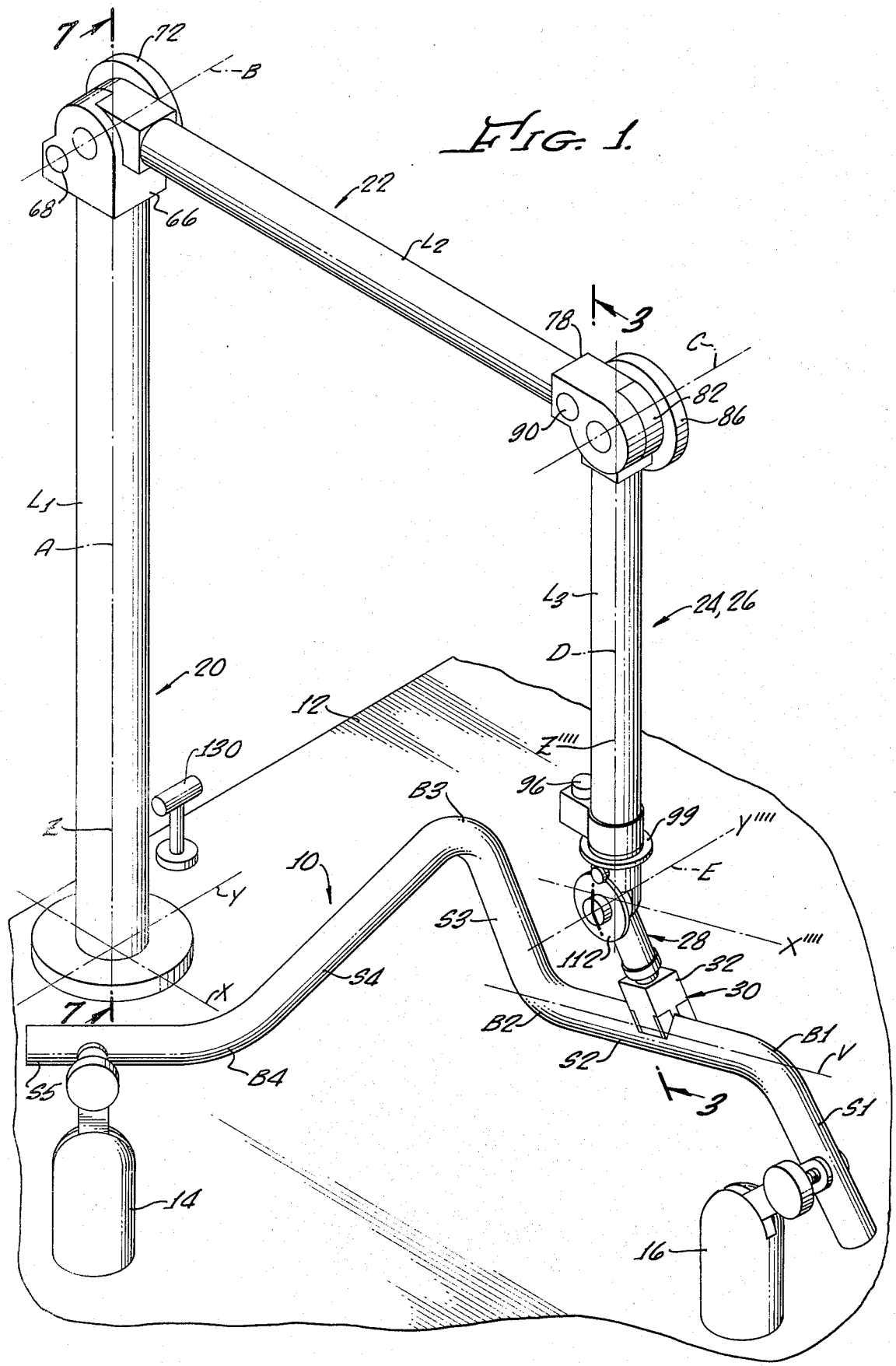
FIG. 1 is a perspective view of a five axis measuring instrument constructed in accordance with the principles of the present invention.

Referring to FIG. 1, a sample bent tube 10 is fixedly mounted to a support or work table 12 by means of a pair of clamps 14, 16 which are detachably but firmly secured as by suction devices or the like (not shown) to any desired points on the table 12. Thus, the tube 10 may be firmly mounted to the table in any one of a number of desired positions or orientations. For many purposes, including inspection and manufacture, it is desired to measure significant parameters of the tube 10. These parameters include the lengths of each tube straight portion (straight) $S_1$, $S_2$, $S_3$, $S_4$ and $S_5$, the angle between adjacent straights, the total length of the tube from end to end, and the plane of each of the tube bends $B_1$, $B_2$, $B_3$ and $B_4$. These parameters, after correction for various types of springback and other factors, may be employed to calculate commands for an automatic tube bending machine (such as described in the above mentioned patents) or may be fed to a computer to check the accuracy of manufactured devices.

According to principles of the present invention, information for these calculations may be acquired accurately, rapidly, simply and with minimum possibility of error by means of a five axis measuring instrument illustrated in FIG. 1. It is known that the various parameters desired to be defined in connection with the sample tube 10, may be calculated from information defining the direction of each tube straight $S_1$, $S_2$, $S_3$, $S_4$, $S_5$, and the position of the respective ends of the tube. For example, given data defining vectors coinciding with the axes of the several tube strights, the angle between adjacent ones of such vectors can readily be calculated in accordance with known principles of trigonometry, and the planes of the several bend angles can likewise be calculated. Calculations for lengths of strights and total length of the bent tube may likewise be made, as deemed necessary or desirable, from measured directions of straights and positions of tube ends.

According to the present invention, each of the vectors that coincides with a respective one of the tube straights is fully and completely defined by a single measurement, or, more specifically, by a single measuring operation, made with the illustrated five-axis measuring instrument.

The measuring instrument of FIG. 1 comprises a first link 20 mounted upon the table 12 for rotation about a first axis A. A second link 22 is pivotally connected to the first link 20 for rotation about a second axis B, which is normal to axis A. A third link 24 is pivoted to the second link 22 for rotation about a third axis C. Rotatably mounted within the third link 24 for rotation about a fourth axis D, normal to axis C and coincident with the axis of the third link 24, is a fourth link 26 (see FIG. 3). The fourth link 26 carries a fifth link 28 for rotation about a fifth axis E which is perpendicular to the fourth-axis D. Each of the second, third and fifth links has nearly 360° of rotation relative to its adjacent link. The first link 22 is capable of a full 360° of rotation with respect to the support and the fourth link is also capable of a full 360° of rotation with respect to the third link, whereby an instrument of relatively small dimensions is able to make measurements on objects of considerably greater dimensions.

Carried in a fixed orientation relative to and by the fifth link 28 is a working head 30. The working head 30 is formed with a V-shaped groove that will readily straddle portions of the tube 10 to thereby define a predetermined angular relation between the working head and the direction that is to be measured. Thus, the working head 30, or more specifically, the tube engaging V-shaped groove thereof has a fixed orientation with respect to the fifth link 28 and when in contact with the tube of which the direction is to be measured will extend in a direction that is precisely parallel to the direction that is to be measured. The V-shaped groove may be said to define a direction axis of the head 30. This direction axis is positioned at a predetermined angular relation to the direction that is to be measured for making a measurement of direction.

For a complete set of measurements of the illustrated tube 10, the working head 30 is moved manually into five successive positions of contact with the tube wherein the V-shaped groove straddles and is in contact with the tube. Only one contact and one measurement need be made on each stright. A first contact is made with the working head straddling stright $S_1$ at its end. Merely positioning the working head in contact with the tube automatically aligns the working head direction axis parallel to the tube axis, and the direction measurement is completed. The working head is then moved from the straight $S_1$ and into contact successively with any intermediate portion of the respective straights $S_2$, $S_3$ and $S_4$. The final measurement is contact with and alignment of the working head direction axis with the final straight $S_5$ at the end portion thereof. For measurement of the straights $S_2$, $S_3$ and $S_4$, coordinate position of any point on the straight may be measured, since only the direction of the tube axis and position of a point on the axis are of interest or required for the calculations. However, for measurements on the straights $S_1$ and $S_2$, both the direction of the axis of the tube and the coordinate position of a point upon the axis at the end of the tube must also be measured. Accordingly for the measurement on the straight $S_1$, the working head 30 is placed in its measuring direction, that is the V-shaped groove straddling the tube and in contact therewith to align the groove (and the head direction axis) in exact parallelism with the axis of the straight. Further, one end surface, surface 32, for example, of the working head, is aligned (in a plane normal to the axis of the straight) with the free end of the straight $S_1$ when the measurement on the straight $S_1$ is made. Since the distance of the surface 32 from the axis of the line 28 is known, coordinates of the end of the straight $S_1$ are thus measured. Similarly for the measurement on the straight $S_5$, the opposite surface of the working head 30, that surface closer to the first link 20 in the position illustrated in FIG. 1, is aligned (in a plane normal to the axis of straight $S_5$ with the free end of the straight $S_5$ to thereby position the last or fifth link 28 in a position to measure both the coordinates of the end of this straight and direction of the straight axis. In other words, the end surfaces of the working head may be used to indicate the position of a point (the intersection of the tube axis and the plane of the tube end) that is fixedly related to the working head.

Thus, it is simply necessary to move the working head into five different successive positions of contact and alignment with the five straights of the tube to be measured. At each position of contact, attainment of the measuring condition and specifically, of the measuring direction by the working head direction axis is signaled (by mechanism to be more particularly described hereinafter) and the several angles of the five links are read out for display, recording or direct real time utilization in calculation of the vectors being measured.

For each measurement of a direction and/or coordinate position of a point, five angles are read. These angles are the angles of rotation of the several links about the five axes A, B, C, D and E. A first angle transducer is provided to read the angle of rotation of the first link 20 relative to the table 12. A second angle transducer is provided to read the angle of rotation of link 22 relative to link 20. Third, fourth and fifth angle transducers are provided to independently read rotation of the third, fourth and fifth links, relative to the second, third and fourth links respectively. The angle or angular motion transducers may take any one of a number of known forms of transducing instruments which change an angular position input to an electrical output representing, either incrementally or cumulatively, tha angular displacement that is being measured. These electrical signals, respectively representing the several angles, together with the known lengths of the several links, collectively define both the direction angles or direction cosines of the working head direction axis and its coordinate position. The direction cosines and coordinate positions are defined in terms of a reference coordinate system having X and Y axes lying in a plane parallel to the work table 10 and having its Z axis normal to the X Y plane and aligned with the A rotation axis.

Even where it is desired to measure only direction (but not position coordinates), it may be necessary to effect both translation and angular displacement of the working head, since different vectors to be measured may not all extend through a single point. The described instrument employs only rotational motions to achieve both translation and angular displacement, although additional non-rotational motions may be added to the rotational motions, if deemed necessary or desirable, to achieve greater flexibility of working head positioning.

MATHEMATICAL BACKGROUND

Figure 2:
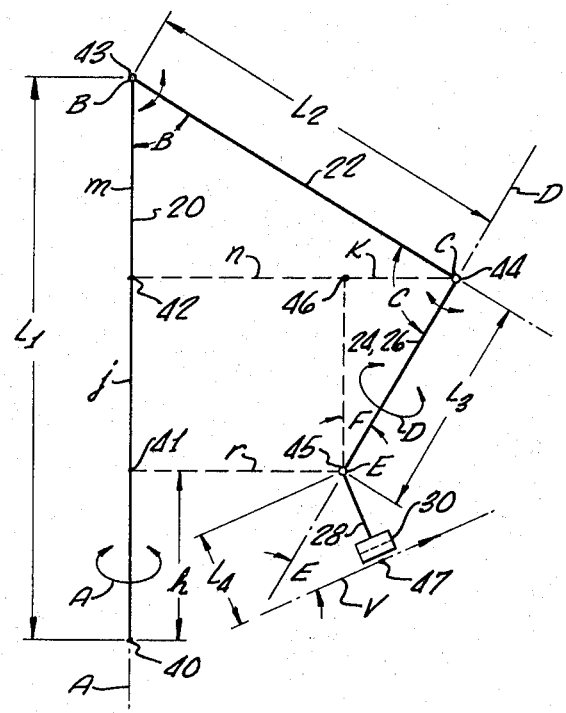
FIG. 2 is a diagram illustrating mathematics involved in defining the measured vector in terms of a reference coordinate system.

In order to understand just how the five angles A, B, C, D and E define the vector, both in position and direction, with respect to a reference coordinate system, reference is made to FIG. 2. It will be understood that angle A is the angle of rotation of link 20 about the A axis, angle B is the angle of rotation of link 22 about the B axis, etc. In the line diagram of FIG. 2, links 20 and 22 are represented by the corresponding lines having lengths $L_1$ and $L_2$ (the link lengths) and links 24 and 26 are represented by the single line having length $L_3$. In the preferred embodiment, the two links, link 24 which is rotatable about axis C and link 26 which is rotatable within link 24 about axis D, are of equal lengths. Link 28 which fixedly carries the working head 30 is represented by length $L_4$. The distance $L_4$ in FIG. 2 is not truly the length of the link 28, but is actually the length of link 28 plus the distance to the center line of the tube being measured. In other words, the length $L_4$ is the distance from the E axis to the point on the vector being measured.

The letter $h$ represents the distance between points 40 and 41 along line 20, $j$ represents the distance between points 40 and 42 on the same line, and $m$ represents the distance between points 42 and 43, which lies on the B axis. Line 20 in FIG. 2 represents link 20 and the A axis. Point 43 represents the B axis, line 24, 26 represents the D axis, point 44 represents the C axis, point 45 represents the E axis, and point 46 represents the intersection between a line $n$, perpendicular to the A axis and extending through the C axis with a line extending through the E axis and perpendicular to the line $n$, $k$. Letter $n$ represents the distance between points 42 and 46, $k$ represnts the distance between points 46 and 44, and $r$ is the distance between points 41 and 45.

The vector V shown in FIG. 2 adjacent the working head 30 is the vector of which the direction is to be measured and a point 47 thereon is the point on which the coordinates are to be measured. For measurements of the bent tube, as illustrated in FIG. 1, the vector V is aligned with and coincident with the axis of the tube. All of the measurements are to be obtained in the refernence coordinate system previously described wherein the Z axis is coincident with the A axis and the X and Y axes are perpendicular to each other and to the Z axis, all intersecting at the point 40.

In the following computations, the direction cosines and coordinates of a point on the vector V will be initially defined in a first rotated coordinate system, then defined in a second rotated coordinate system and then defined in two further translated coordinated systems of which the final coordinate system is the reference system itself.

A first rotated coordinate system $X''''$, $Y''''$, $Z''''$, is selected in which $Z''''$ is coincident with the D axis of the five axis measuring instrument, $Y''''$ axis is parallel to the axis C and passes through the intersection of axes D and E, and $X''''$ is normal to $Y''''$ and $Z''''$. In this coordinate system, $\alpha''''$, $\beta''''$ and $\gamma''''$ are direction cosines or direction angles of the unknown vector V and $x''''$, $y''''$ and $z''''$ are the coordinates of the point 47 on the vector V. From basic trigonometry, $$\alpha'''' = \cos D \sin E$$

$\beta'''' = \sin D \sin E$
$\cos \gamma'''' = \cos E$
$x'''' = L_4 \cos E \cos D$
$y'''' = L_4 \cos E \sin D$
$z'''' = -L_4 \sin E$ $F = 180° - (B+C)$ where F is the angle between the D axis and the line between points 45 and 46.

As a first step in the transformation, the coordinate system $X'''', Y'''', Z''''$ is rotated about the $Y''''$ axis through the angle F to obtain the second rotated coordinate system $X''', Y''', Z'''$. The direction cosines and coordinates $\alpha''', \beta''', \gamma'''$ and $x''', y''', z'''$, as expressed in $X'''', Y'''', Z''''$, may be defined as follows:

$\alpha''' = \alpha'''' \cos F + \gamma'''' \sin F$
$\beta''' = \beta''''$
$\gamma''' = -\alpha'''' \sin F \gamma'''' \cos F$
$x''' = x'''' \cos F + z'''' \sin F$
$y''' = y''''$
$z''' = -x'''' \sin F + Z'''' \cos F.$ Now the rotated coordinate system $X''', Y''', Z'''$, is rotated about the $Z'''$ axis through the angle A to get a first translated coordinate system, $X'', Y'', Z''$ of which the $X'', Y'', Z''$ axes are parallel to the X, Y, Z axes of the reference system. In this third rotated system, the vector V is expressed by direction cosigns $\alpha'', \beta'', \gamma''$ and $x'', y'', z''$.

$\alpha'' = \alpha''' \cos A - \beta''' \sin A$
$\beta'' = \beta''' \sin A + \beta''' \cos A$
$\gamma'' = \gamma'''$
$'' = x''' \cos A - y''' \sin A$
$y'' = x''' \sin A + y''' \cos A$
$z'' = z'''.$ Now the origin of the first translated coordinate system $X'', Y'', Z''$ is translated in the $X'', Y''$ plane through the distance r to the reference system Z axis to obtain a second translated coordinate system $X', Y', Z'$ in which the origin of the system $X'', Y'', Z''$ has coordinates $x'_0$ and $y'_0$, where $x'_0 = r \cos A$ and $y'_0 = r \sin A$.

Further, $m = L_2 \cos B$
$n+k = L_2 \sin B$
$k = L_3 \sin F$
$r = n = L_2 \sin B - k = L_2 \sin B - L_3 \sin F$ Accordingly, $x'_0 = (L_2 \sin B - L_3 \sin F) \cos A$ and $y'_0 = (L_2 \sin B - L_3 \sin F) \sin A$ Now the coordinates of point 47, as expressed in the translated coordinate system $X', Y', Z'$ are $x' = x'' + (L_2 \sin B - L_3 \sin F) \cos A$ $y' = y'' + (L_2 \sin B - L_3 \sin F) \sin A$, and $z''' = z''$ As a final step, the origin of the coordinate system $X', Y', Z'$ is translated along the coincident $Z'$ and Z axes by the distance h to obtain the reference coordinate system X, Y, Z, where $h = L_1 - m - j = L_1 \cos B - L_3 \cos F$.

The coordinates of point 47 in the reference system therefore, are
$x = x'$
$y = y'$
$z = z' + L_1 - L_2 \cos B - L_3 \cos F$ As previously stated, the direction cosines $\alpha, \beta, \gamma$, of the vector V in the reference X, Y, Z coordinate system are
$\alpha = \alpha''$
$\beta = \beta''$
$\gamma = \gamma''$ Substituting in the above equations, the final values of the direction cosines and position coordinates of the point 47 as expressed in the reference system X, Y and Z, are as follows:

$\alpha = (\cos D \sin E \cos F + E \sin F) \cos A - \sin D \sin E \sin A$
$\beta = \sin A (\cos D \sin E \cos F + E \sin F) + \sin D \sin E \cos A$
$\gamma = E \cos F - \cos D \sin E \sin F$
$x = (L_4 \cos E \cos D \cos F - L_4 \sin E \sin F) \cos A - (L_4 \cos E \sin D) \cos A + (L_2 \sin B - L_3 \sin F) \cos A$
$y = [L_4 \cos E \cos D \cos F - L_4 \sin E \sin F] \sin A + (L_4 \cos E \sin D) \cos A + (L_2 \sin B - L_3 \sin F) \sin A$
$z = -L_4 \cos E \cos D \sin F - L_4 \sin E \cos F + L_1 - L_2 \cos B - L_3 \cos F.$ It is evident from the above that the measured direction is a vector defined in three dimensions by the three direction cosines and three coordinates. The working head 30 is moved into a selected relation with respect to the vector by mounting the head for movement in three dimensions and with components of rotation about three mutually orthogonal axes.

DETAILED STRUCTURE

Referring now to the instrument structure shown in FIGS. 1 through 9, the first link of the measuring instrument is carried in a fixed column 50 (FIG. 7) rigidly mounted to and upstanding from the table 12, and carrying at its lower and upper ends bearings 51, 52 which rotatably mount a first tubular link 54. Link 54 has an extension 56 fixed to the bottom thereof carrying a drive gear 58 that meshes with a driven gear 60 of a first angle transducer 62, which is fixed to the table 12.

Fixed to the upper end of the rotatable link 54 is an upper extension 64 that fixedly carries an end block 66 in which is mounted a second angle transducer 68. Angle transducer 68 has an input gear 70 that meshes with and is driven by a gear 72 fixed to a pivot block 74 that rigidly carries a second tubular link 76. Pivot block 74 is journalled upon the end block 66 for rotation about the B axis. Details of this journal are substantially the same as those illustrated in connection with the pivot joint between tubular links 76 and 84, about the C axis, as illustrated in further detail in FIG. 3.

Referring now to FIGS. 1 and 3, the second tubular link 76 fixedly carries an end block 78 upon which is journalled, by means of bearings 80, a pivot block 82 that fixedly carries a third tubular link 84 for rotation about the C axis. Pivot block 82 fixedly carries a driving gear 86 that meshes with an input gear 88 of a third angle transducer 90 (FIG. 4) that is carried by the end block 78 of the second tubular link 76.

The third tubular link 84 has an end block 94 carrying a fourth angle transducer 96 having an input gear 98 driven by a gear 99.

Rotatably journalled to and within the third tubular link 84 for rotation relative thereto about the D axis (which is aligned with the axis of the third link 84) is a fourth link 100. Link 100 is mounted coaxially of and within the link 84 and its end block 94 by means of bearings 102, 104. Link 100 carries a fixed end block 106 on which is mounted the gear 99 that drives transducer 96. Also mounted on end block 106 is a fifth angle transducer 108 having an input gear 110 that is driven by a gear 112. Gear 112 is fixed to a pivot block 114 carried by a fifth tubular link 116. The pivot block 114 of tubular link 116 is journalled upon the end block 106 of the fourth link 100 by means of bearings 118 for rotation about the E axis.

Fixedly secured to and forming part of the final or fifth link 116 is the working head 30 having its outer end forming a V-shaped groove 120 which is adapted to straddle and contact, in the relation illustrated in FIG. 3, a portion of a tube 10 of which the direction is to be measured. Working head 30 carries a manually operable command button 122 for purposes to be described hereinafter. The working head 30 and fifth link 116 are securely but detachably connected to pivot block 114 by a threaded sleeve arrangement illustrated at 115.

As shown in FIGS. 8 and 9, working head 30 includes a body 124 carrying four mutually spaced and mutually insulated electrical contact elements 125, 126, 127, 128 having contact edges 125a, 126a, 127a, 128a. The contact edges are adapted to make electrical contact with the outer surface of the metallic tube 10. The surfaces 125a through 128a, form alignment means to orient the head in its measuring direction and also define the direction axis of the head. They are so positioned and aligned that when all four are in firm engagement with the outer surface of a cylinder such as the tube 10, the working head direction axis has a known angular relation with respect to the axis of the cylinder. More specifically, the head is oriented or aligned precisely parallel with the axis of the cylinder. The four electrical contact elements 125 through 128 are connected in an electrical circuit illustrated schematically in FIG. 11 and more particularly described in detail in connection with the description of FIG. 11. The circuit signals attainment of the measuring direction, wherein all four contacts engage the tube.

The several angle transducers are conventional angle measuring instruments such as resolvers or angle position encoders which provide electrical output signals indicative of the input angular displacements thereto. Thus, the electrical signal outputs of the five angle transducers 62, 68, 90, 96 and 108, provide signals representing the angles A, B, C, D and E in the above described equations. The several distances are predetermined and the angle F is readily calculated, being equal to $180° - (B+C)$ as may be determined from inspection of the geometry of FIG. 2.

Also fixed to the work table 12 is a cylindrical reference or calibration bar 130 (FIG. 1) having a fixed position and orientation with respect to the reference coordinate system.

With the working head in aligning contact with the outer surface of the calibration cylinder 130, the angle outputs of the several angle transducers may be considered to be zero or some other reference value. Instrumentation for recording or electronically accumulating values of the angles indicated by the several angle transducers may be properly zeroed or reset with the working head in the reference orientation defined by the reference bar 130 as will be more particularly described below in connection with the description of FIG. 11.

READ OUT CONDITIONING

It will be readily appreciated that the electrical signal outputs from each of the five angle sensors are continuously available from the sensors and accordingly, the output indications thereof will be varying whenever a link of the articulated probe is moving. These signals, of course, may be read visually, by suitable dials or gauges in either analog or digital form, may be directly recorded in either analog or digital form, or may be recorded or displayed for later utilization. Alternatively, the signals may be fed directly to a data processing machine such as an analog or digital computer for use in appropriate computation. The desired computation may be performed either by hand or by special or general purpose digital or analog computer, and will employ the measured sensor output angles A, B, C, D and E, in accordance with the several equations set forth above, to obtain the coordinates $x$, $y$ and $z$ of the point on the vector being measured (if a point is desired) and also the direction cosines $\alpha$, $\beta$, and $\gamma$, all measured in the reference coordinate system X, Y and Z. As explained above, the measured angles A, B, C, D and E, read directly from the sensors, collectively define both direction and position of the vector in the reference system X, Y, Z when taken with the lengths of the fixed links of the articulated instrument.

One may simply place the working head in an orientation or direction having a fixed angular relation with respect to a line which itself has a fixed angular relation with respect to the object being measured, and then read the outputs of the angle sensors. Nevertheless, it is possible that the working head may not be in the desired orientation or may yet be moving when the angles are read out, particularly if the articulated links are being manipulated by hand. Accordingly, an improved angle read out is achieved by gating the angle read out in accordance with one or more of several specified conditions. A first one of these conditions is the attainment of the desired measuring direction or position by the working head. A second condition is that the working head velocity should be zero. Because the measurement may be one of a series of rapidly made measurements, it is preferably made when the working head is no longer moving.

Although it is possible to read out all of the angles in parallel, it is convenient in many situations to read the five angles in sequence as by a multiplexing arrangement for example. Accordingly, a third condition (where sequential angle read out is employed) is the existence of the zero velocity condition for a time sufficient to enable at least one read out of all five angles. It will be readily appreciated that two or more of full cycles of read out of each of the five angles will enhance accuracy. With regard to the last condition, the velocity must have been zero and, also, the working head must have been in its measuring orientation for a time sufficient to allow at least five consecutive read outs of the angle.

Where the probe is moved manually to its measuring direction and position, under control of an operator, it is desirable to allow the operator to signal when the read out should occur. Accordingly, a fourth condition is an operator's read command. This may conveniently take the form of a manual push button to be actuated by the operator as the working head approaches its measuring position and direction. This read command should be actuated before the measuring position and direction are attained so that the read out will occur upon initial occurrence of all of the other conditions. This arrangement avoids a situation wherein the working head is pressed too firmly against a resilient or dispaceable surface so that the latter would be deflected from its true orientation before the read command is given.

In some situations, such as for example, where the angle sensors provide output signals representing fractional units of a single revolution and other external equipment is employed to count the total number of full revolutions, such count of full revolutions may be degraded if the transducer output changes too rapidly. In other words, recording equipment in such a situation may be unable to keep up with exceedingly rapid rotations of the articulated links. To this end, a signal may be provided whenever velocity of the working head exceeds a predetermined amount, or more specifically, whenever the output of any one of the transducers changes at a rate that is above a selected maximum rate.

Figure 10:
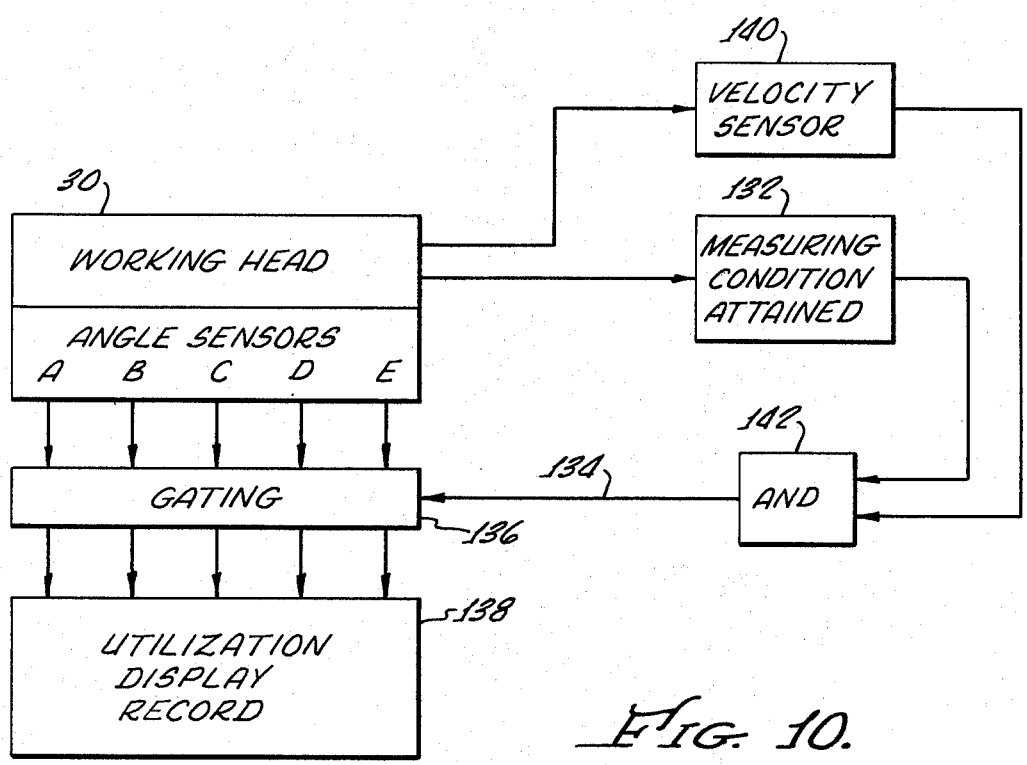
FIG. 10 is a block diagram of an exemplary form of readout control of the angle sensors.

Conditioned read out of the angles is achieved by the arrangement illustrated in FIG. 10 wherein the outputs of all of the angles sensors A, B, C, D and E, are fed through a gating circuit 136 to utilization display or recording apparatus 138. The gating circuit is controlled by the output on line 134 of a coincidence or AND circuit 142 so that the angle signals are fed to the utilization, display or record apparatus only when there is an enabling output from the AND circuit 142. The output of the AND circuit is true when and only when the predetermined conditions of read out as described above, exist. These conditions, as mentioned above, may comprise the attainment of the measuring condition 132, which includes the operator's read command and the attainment of measuring direction and position. A velocity sensor 140 responsive to motion of the working head provides an additional input to AND circuit 142 representing working head at rest or zero velocity. Therefore, a measuring condition attained signal on line 134 will exist only when all four conditions occur together, that is, the operator's push button has been actuated, the working head has been in contact or in its measuring direction, while at rest, and for a finite time interval.

Illustrated in FIG. 11 is an exemplary mechanization of the conditioned read out of all five angles of the described articulated instrument wherein the angle outputs are multiplexed and digitized. The angle sensors may be conventional resolvers such as encoders model ST11 of Astrosystems Inc., of New York City, New York. Many other types of angle sensors may be employed, such as, for example, incremental magnetic position encoders shown in U.S. Pat. No. 3,222,660 to W. A. Farrand. In this arrangement, the resolver outputs represent fractions of one full revolution of the resolver input gear and other circuitry, described below, tracks and stores the total number of revolutions and fractions thereof. The outputs of resolvers 62, 68, 90, 96 and 108 are fed to a multiplexor 146 on input lines 146a–e to provide on the multiplexor output line 146f, the analog outputs of the resolvers, in sequence. The multiplexor sequentially switches its several inputs, one at a time, to its output under control of channel 1 though channel 5 timing signals provided at the output of a modulo five counter 148.

Resolution of the measurements is enhanced by use of suitable gear ratios, causing the resolver input shafts to turn many times for a single or fractional turn of the associated links. For example, a gear ratio of 330/26 has been employed for each of A, B and C and 216/26 for each of axes D and E.

The multiplexor output is fed to an analog to digital converter 150 which may be, in a particular example, a syncro to digital converter, Model No. E-C10125-1, made by the above-mentioned Astrosystems Inc. specifically for use with the encoders identified above. The syncro to digital converter provides on its output bus 156 a digitized version (in a twelve bit binary code for example) of each of the encoder outputs in sequence.

The syncro to digital converter 150 also provides an output signal on line 152 to indicate the end of each of its conversion operations. That is, when the converter has completed a conversion of an analog input to its twelve bit digital output form, it provides an output signal on line 152 which is fed to a delay circuit 154 and thence as a counting input to the modulo 5 counter 148. Accordingly, the counter advances one count upon completion of each conversion and the multiplexor output thereupon presents the next angle to the input of the converter for digitization. The delay interposed between the converter and the counter allows the converter to complete two conversion cycles (digitizing each of the five angles two times) and thus avoids premature switching of the multiplexor from one input channel to the next. the output of the syncro to digital converter is fed via bus 156 to a buffer storage 158 which is triggered to accept the twelve bit digitized angle signal from the converter upon the occurrence of the output of the delay circuit which is fed both as a counting input the the counter and a transfer trigger to the buffer storage.

The buffer storage stores one digitized angle signal at a time and feeds each such digitized signal through a gate 160 for storage in an accumulator 162 that retains each of the angle signals A, B, C, D, in digital form. The gate 160 is repetitively triggered by the five channel 1 through channel 5 signals derived from the output of the modulo 5 counter but in a phase lagging relation such that when channel 1 of the multiplexor is open and feeding the angle A resolver signal to the converter, the gate 160 is feeding the angle E contents of the buffer storage to the accumulator, and when the angle B resolver signal is being fed through the multiplexor, the buffer storage is being fed through the sequential gate to store angle A. Thus, after each angle is converted and stored in the buffer, it is gated out to the accumulator while the next angle is being digitized.

In the accumulator 162 the change in the most recently digitized value of each angle, angle A for example, is added to the previously accumulated total value of angle A. Thus, the accumulator has the contents thereof augmented by the difference between each converted digitized resolver output and the previous value thereof, and accordingly will retain a continuously varying value of each of the digitized angles A, B, C, D and E. Difference circuitry and inputs as described below and illustrated at 180, 182, but providing quantitative outputs, may be incorporated in the accumulator 162 to obtain the angle "delta" or difference that is added to the angle values stored in the accumulator for each angle digitization. The contents of the accumulator are changing in accordance with variation of the resolver angles at all times, whether or not any of the previously mentioned conditions have occurred. In other words, even while the working head is moving from one measurement position to another measurement position, the resolvers continue to provide a varying angle output and the accumulator continues to change its contents to keep a continuously updated record of the angle values.

Upon occurrence of selected conditions of measurement readout, the contents of the accumulator are fed through a gating circuit 166 to the desired utilization, display or recording apparatus 138. Thus the output of the gating circuit 166 may be fed to a suitable display of the values of the accumulator contents, or may be fed to a recorder or fed directly to to the input of a computer. An analog or digital computer 168 having inputs representing the lengths $L_1$, $L_2$, $L_3$ and $L_4$ may be interposed between the accumulator output gating 166 and the output apparatus 138 to calculate the direction cosines $\alpha$, $\beta$, $\gamma$ and the position coordinates $x$, $y$, $z$ in accordance with the equations set forth above.

The accumulator output gating is triggered by the output of an AND gate 170 which has a first input on line 172 from the measuring condition attained signal and has a second input on line 174 from the output of an AND gate 176 that comprises a portion of a velocity sensor logic circuit.

Referring now to the working head contact element circuitry shown in FIG. 11, the exemplary V-groove working head has four mutually spaced and mutually insulated electrical contacts 125–128 of which 125, 126 and 127 are connected in parallel via resistors R1, R2 and R3 to one side of a voltage source 178. Working head contact 128 is connected to the other side of the voltage source 178 through the operator's read command push button 122. Accordingly, if button 122 is actuated to connect contact 128 to the voltage source, and if all of the contacts 125, 126, 127 and 128 are in electrical contact with the electrically conductive pipe of which the direction is to be measured, a signal appears on line 172 to provide a first input to AND gate 170. If one or more of the contacts 125, 126 and 127 is not in contact with the pipe being measured, the signal on line 172 does not have sufficient magnitude to enable the AND gate 170. Further, if button 122 is not operated or if the contact 128 is not in contact with the pipe being measured, the circuit is not completed, and there can be no enabling input to the AND gate 170.

Although various types of zero velocity sensors may be employed, such as velocity meters or acceleration sensing devices directly mounted on the working head, it is found convenient to detect the rest condition of the working head by detecting the rate of change of the outputs of each of the angle resolvers. For example, if the digitized output of angle resolver 62 (angle A) has not changed from one digitization thereof to the next by more than one unit of resolution (there being $12^2$ units of resolution in the 12 bit digitization) it may be considered that this resolver is at rest and has a zero velocity. Similarly, the outputs of each of the other resolvers must not have changed by more than one unit of resolution and thus the entire working head is known to be at rest, since other motions (other than rotations about the five axes A, B, C, D and E) of the working head are restrained by the illustrated construction.

For the purpose of comparing change of each angle from one digitization to the next, each digitized angle, as it is passed through sequential gate 160 is fed through a delay network 180 for temporary storage in a difference circuit 182 having storage sections $A_{n-1}$, $B_{n-1}$, $C_{n-1}$, $D_{n-1}$ and $E_{n-1}$. During the next cycle of five conversions by the syncro to digital converter 150, the digitized angle values $A_n$, $B_n$, $C_n$, $D_n$ and $E_n$ (where $A_n$ is the measured value that immediately follows the measured value $A_{n-1}$, etc.) are fed directly to the difference circuit for comparison with their previous values $A_{n-1}$, $B_{n-2}$, $C_{n-1}$, $D_{n-1}$ and $E_{n-1}$. The $A_n$, $B_n$, $C_n$, $D_n$, $E_n$ signals are also fed through delay 180 to replace the previous stored values $A_{n-1}$, $B_{n-1}$, $C_{n-1}$, $D_{n-1}$ and $E_{n-1}$. If the difference between the value of each angle and its previous value is less than a predetermined amount, such as for example, one unit of resolution, a true signal is fed via a respective one of the lines 182a–182e to enable AND gate 176 to thereby provide a second enabling signal to AND gate 170 when and only when all of the five angles have not changed by more than the predetermined value.

Since the described difference circuit will enable AND gate 176 only when differences related to all of the five angles have been determined, this arrangement inherently provides a delay that insures the reading of all five angles, wherefor no separate circuit, such as a counter for counting five or more channel switching operations of the multiplexor or outputs of the counter, is needed to ensure that all five angles have been read out of the resolvers, digitized and fed into the accumulator. Nevertheless, additional delays and delay circuits may be provided if more cycles of digitization are desired before reading out of the accumulators.

If deemed necessary or desirable, the same difference circuit 182, or a circuit substantially identical thereto, may be arranged to provide a second velocity output indicating that the working head motion is too fast. Such an output is provided on any one of lines 183a–183e when the difference between the value of one of the angles and its previous value is greater than a predetermined amount. The lines 183a–e are fed as inputs to an OR circuit 184 so that if there is a signal on any one of these lines indicating that one of the angles is changing too rapidly, an output signal will appear on line 186 at the output of the OR circuit 184 to warn the operator and enable him to move the working head back to its reference position (in contact with calibration rod 130 of FIG. 1), and to reset the accumulator by applying a reset signal on line 188.

Although the accumulator in the arrangement of FIG. 11 will follow and retain the most recently generated angles of the several angle sensors, it is, nevertheless, desirable to reset the accumulators (with the working head in a reference direction and position) from time to time, at least after each group of measurements, for several reasons. Periodic recalibration or resetting avoids buildup of errors due to drift or other spurious signals that may enter the system. When changing the working head, whether a different size, shape or angle of working head is employed, it is necessary to reset the accumulators and to reset the system with the newly attached working head in the reference direction and position defined by the calibration rod 130. A manual reset signal may be also employed to reset other circuit registers and processing arrangements in the computer to enable or to permit the beginning of an entirely new set of computations. Similarly, resetting may be required when an object of different size or shape is being measured.

MODIFICATIONS

The working head 30 with its V-shaped groove 120 is particularly adapted to enable the working head to be angularly displaced from the reference direction until it attains a measuring direction that is precisely parallel to the axis of a tube straight being measured. It will be readily appreciated that many other types and shapes of working heads may be substituted for the working head 30 to enable alignment of the working head direction axis in a direction fixedly related to an object other than a cylindrical shape. For example, as illustrated in FIG. 12, optical alignment of the working head may be employed. Thus, the same articulated links 20, 22, 24, 26 and 28 with their angle sensor read out may be employed, all constructed and arranged as shown in FIGS. 1 through 7. However, in the place of the working head 30, fixed to the fifth link 28, there is provided an optical working head 200. Such an optical working head may take many forms, such as for example, the autocollimator illustrated in U.S. Pat. No. 3,024,365 to Smith et al. Briefly, such an autocollimator comprise an electro-optical system which projects a beam of light 202 toward a reflective surface 204, and receives returning light reflected from the surface 204. The autocollimator is employed to measure the direction of a normal to the surface 204. In certain applications, the surface 204 may comprise a mirror fixed to a navigating instrument, such as a stable platform of an inertial navigator 206. Such navigators require precision alignment with respect to known directions on the earth or with respect to the fixed stars, prior to use. Accordingly, the autocollimator will project a beam of light and receive the reflection thereof from the surface of which the direction of a normal is to be measured. When the reflected beam is coincident with the projected beam, the optical axis of the autocollimator (e.g. the direction axis of this working head) is precisely normal to the reflecting surface and the latter therefore has a known angular relation with respect to the direction axis of the autocollimator.

In accordance with the present invention, the autocollimator is mounted to constitute the alignable working head of the meauring instrument. It may be readily displaced angularly about any of the five rotational axes of the instrument, until its optical or direction axis is precisely or substantially aligned with a normal to the reflecting surface 204. It may be noted that certain autocollimators, such as that shown in the Smith et al patent, will read out a deviation between the autocollimator axis and the direction normal to the surface being observed. In such a case, the deviation is combined with the direction of the autocollimator optical axis, as defined by the angles A, B, C, D and E, which are read from the several angle sensors of the measuring instrument as previously described. Although position coordinates of a point on the autocollimator may still be measured as described above, in connection with position coordinates of a point on the vector being measured, such position is now required for measurements of alignment only.

Even when position measurement is not required it is still necessary to translate the working head because all directions to be measured do not intersect a single point and the working head direction axis must actually be moved both angularly and translationally. The described articulation achieves both translation and rotation solely by the use of rotary motions, although additional translational or rotational freedoms may be provided.

Another and simpler type of optical alignment is also illustrated in FIG. 12 as comprising a pair of optical sighting devices such as conventional gun sights or reticles, 208, 210 mounted on the working head 200 to define an optical or direction axis of the working head. When using these sights 208, 210, the working head is aligned until the line of sight through the sights 208, 210 is precisely aligned with a line such as the edge 212 that is fixedly related to or part of the object being measured.

The several optical alignment arrangements illustrated in FIG. 12 are merely exemplary of various types of radiant energy, magnetic or other alignment devices that are well known. Such alignment devices need merely be fixed to the end link 28 of the described five axis articulated measuring instrument and then translated and angularly displaced to a position of alignment with respect to a direction to be measured. Upon attainment of such a measuring direction, automatic means, or manual means controlled by the operator, may be actuated to signal attainment of the measuring direction so that the five instrument angles may then be read out as previously described.

Illustrated in FIG. 13, is a modified form of contacting working head which is mounted to the support 12 by means of the articulated links 20, 22, 24, 26 and an end link 214 which, in this case, is bent at an angle such as 90° to allow the working head to extend in still other directions that may be inconvenient with the straight fifth link 28 of FIG. 1. The working head shown in FIG. 13 may be identical to that illustrated in FIGS. 8 and 9 except for the orientation of its direction axis (V-groove) with respect to the instrument axes.

Although the vector to be measured can be fully and completely defined in a reference coordinate system by angular rotation through the five illustrated degrees of rotational freedom, about the axes A, B, C, D and E, it will be readily appreciated that six or more degrees of freedom may also be employed with corresponding changes in the equations defining the vector in terms of the six or more angles. For example, the working head, instead of being fixed to the final arm 28 may be pivoted to the arm 28 about an axis parallel to, perpendicular to, or extending at some other angle with respect to the axis E. An angle sensor for read out of the angle of rotation about such sixth axis would also be provided. Alternatively, as illustrated in FIG. 13, an arrangement employing a sixth axis of rotation may comprise another rotational axis coincident with the axis of the second link 22. Thus, the link 22 may be made in two parts, 22a and 22b, constructed and arranged substantially identical to the two links 24, 26 and their corresponding elements 84, 100 illustrated in FIG. 3. Thus, link 22b is rotatably journalled to and within the link 22a for rotation about the axis of the latter and a resolver 216 is provided to read out the rotation of the link 22b relative to the link 22a about this sixth axis. It will be readily appreciated that the sixth axis, or still other axes may be chosen or located at different points in the illustrated arrangement. Further, even where only five axes are employed, these need not be oriented with respect to one another in the manner shown but various angular relations of such five axes relative to one another may be employed without departing from principles of the present invention. A significant feature of the present invention in the attainment by the working head of an orientation that is defined completely in terms of the angular rotations about the several axes of rotation.

The radiant energy working head illustrated in FIG. 12 enables measurements of direction without contacting the object of which the direction is to be measured, and uniquely facilitates the measurement of a normal to a planar surface with a single observation. If the normal to such a surface were to be defined by terms of coordinate positions of three or more separate points thereon using prior art coordinate position measuring instruments, such instruments would require three separate and independent measurements. With the measuring instrument described therein, on the other hand, only a single measurement or measuring operation is required. It is not necessary to make three different setups or three different contacts with the surface.

Another form of surface measuring working head, specifically adapted to measure direction of a normal to a surface by contact with the surface is illustrated in FIGS. 14 and 15, together with the fifth link which, in this case, is indicated by reference numeral 220. The fifth link 220, FIG. 14, comprises a rigid, hollow, tubular member 222 fixedly carrying a pivot block 224 which is functionally analagous and geometrically similar to the pivot block 114 shown in FIG. 3. Thus, the pivot block 224 may be journalled to the end block 106 of the fourth link in the manner illustrated in FIG. 3. Pivot block 224 has secured thereto a resolver driving gear (not shown in FIG. 14) similar to the gear 112 to enable read out of the Angle E. Journalled to and within the tubular member 222, upon bearings 226, 227, for rotation about a working head swivel axis, is an angulated swivel arm 230 fixedly carrying a contact plate 232. Extending slightly from the outer surface 234 of contact plate 232 are three contact pins 236, 238, and 240 that collectively define a plane which is fixedly oriented with respect to the working head 230 through 240. A normal to such plane is the direction axis of this working head. If deemed necessary or desirable, the three contact pins 236, 238, and 240 may be electrically connected with an operator's push button in a circuit substantially identical to that illustrated in FIG. 11 with respect to contact elements 126, 127 and 128. Such a circuit simply omits one of the contacts, such as the contact 125. The circuit values are changed to ensure a signal on the output line indicating the measuring condition had been attained, when and only when all three contact pins 236, 238 and 240 are in contact with an electrically conductive planar surface of which the direction is to be measured.

It will be readily appreciated that where contact measurements are made on surfaces that are not electrically conductive, other contact sensing arrangements may be employed or the attainment of the measured position may simply be determined by the operator's observation. Furthermore, actual contact of the planar working head 232 through 240 need not be achieved since it is only necessary to move the working head to an angular position in which its orientation plane (as defined, for example, by elements 236, 238 and 240) is precisely parallel to the surface being measured. Such a parallel relation will exist when two surfaces are equidistant and accordingly, measurement of the distance between the working head and the surface to be measured, at three space points, indicates occurrence of such parallelism. The three point contact is but a special case of such three distance measurements.

If coordinate position of a point is to be measured with the working head of FIGS. 14 and 15, the working head is positioned until one of its edges (or one of the contact elements 236, 238, 240) which is normal to the surface 234 is at the point to be measured, thus defining a coordinate position of a point on the working head.

It will be readily appreciated that other types, shapes and sizes of working heads may be employed for determining attainment of a measuring direction by contact between the working head and the object. For example, as shown in FIG. 16, the working head may take the form of a cylindrical surface or rod 250 which is fixedly carried by the end link 28. This configuration will facilitate alignment of the working head with a concave surface, a groove or depressed track in an object.

An alternative form of working head for use with alignment of cylindrical surfaces is illustrated in FIG. 17 as comprising a working head 252 having an elongated concave cylindrical surface fixed to the end link 28. The various working heads may have different types of contact elements to signal attainment of the measuring direction and such contact elements (and also the related signaling circuitry) may be substantially identical to those described in connection with the working head 30.

In many applications, and particularly where a working head of the type shown in FIGS. 14 and 15 is used to measure direction of a normal to a surface, it may not be necessary to stop motion of the head in order to read out the angles. Thus, it may be sufficient to measure the direction of a normal anywhere within a selected area of a surface, so that the zero velocity condition of accumulator readout is not necessary and the working head can be moving anywhere within the selected area, but always in its measuring orientation, when readout occurs.

There have been described methods and apparatus for direct measurement of a vector which measurement is simple and readily made. The measurement employs an instrument of relatively small size and mass, capable of making measurements on a variety of shapes and sizes of objects, which is exceedingly flexible and has a mass and weight small enough to provide feasible portability.

The foregoing detailed description is to be clearly understood as given by way of illustration and example only, the spirit and scope of this invention being limited solely by the appended claims.

What is claimed is:
1. In combination,
a support,
a working head having a direction axis,
an articulated arm mounting the head to the support for movement with components of rotation about a plurality of mutually angulated axes to diverse angular orientations, and means responsive to articulation of said arm for generating a set of signals that collectively define the angular orientation of the head direction axis.

2. The apparatus of claim 1 wherein said arm includes means for mounting the head to the support with at least five degrees of rotational freedom.

3. The apparatus of claim 2 wherein said means for generating includes a plurality of angular motion transducers for generating signals respectively indicative of angular motion through respective ones of said five degrees of freedom.

4. The apparatus of claim 1 including means responsive to said signals for indicating the position of a point fixedly related to said head.

5. The apparatus of claim 1 including means for generating a condition attained signal in response to arrival of said working head direction axis at an angular orientation having a known angular relation relative to a direction that is to be measured.

6. The apparatus of claim 5 including means responsive to said condition attained signal for providing an output indicative of the values of signals of said set.

7. The apparatus of claim 1 wherein said working head includes contact means for defining said direction axis and orienting said working head, said contact means being adapted to engage an object having a known angular relation relative to the direction that is to be measured.

8. The apparatus of claim 1 wherein said working head includes optical alignment means for defining said direction axis and for orienting said working head relative to the direction that is to be measured.

9. In combination
a support,
a working head having a direction axis,
an articulated arm mounting the head to the support for movement to diverse angular orientations, and
means responsive to articulation of said arm for generating a set of signals that collectively define the angular orientation of the head direction axis, including alignment means for defining said direction axis and for indicating angular orientation of the working head relative to the direction that is to be measured, thereby to facilitate alignment of said working head.

10. The apparatus of claim 9 wherein said alignment means comprises a plurality of contact elements on said working head, and means for generating a condition attained signal in response to engagement of at least a group of said elements with an object.

11. The apparatus of claim 9 wherein said alignment means comprises a set of three contact elements on the working head collectively defining a plane normal to said direction axis.

12. A measuring instrument comprising
a support,
a working head adapted to be aligned in a measuring direction having a fixed angular relation with respect to a direction that is to be measured in three dimensions, means including a plurality of pivotally interconnected links for mounting the working head to the support for motion of said working head through a plurality of diverse orientations in three dimensions, and
means for measuring the angular relations between adjacent ones of said links to provide a set of measured values that collectively define the direction to be measured.

13. The instrument of claim 12 including means for enabling read out of said angular relations in response to attainment of said measuring direction by said working head.

14. The instrument of claim 12 including means for enabling read out of said angular relations upon ococurrence of at least one of a group of selected conditions.

15. The instrument of claim 14 wherein one of said conditions comprises the attainment by said working head of said measuring direction.

16. The instrument of claim 14 wherein one of said conditions comprises an operator's read out command.

17. The instrument of claim 14 wherein one of said conditions comprises a condition of substantially zero velocity of said working head.

18. The instrument of 17 wherein one of said conditions comprises the retention of said measuring direction by said working head for a predetermined interval of time.

19. The instrument of claim 12 wherein said working head includes radiant energy means for aligning the head in said measuring direction.

20. The instrument of claim 19 wherein said radiant energy means comprises an optical alignment device.

21. The instrument of claim 20 wherein said optical alignment device comprises an autocollimator.

22. The instrument of claim 12 including means responsive to said measured values for indicating both the direction and coordinate position of said working head in a reference coordinate system.

23. The instrument of claim 12 including calibration means fixed to said support for defining a reference direction, said head being movable to a reference orientation having a fixed angular relation with respect to said reference direction.

24. A measuring instrument comprising
a support,
a working head adapted to be aligned in a measuring direction having a fixed angular relation with respect to a direction that is to be measured, a plurality of pivotally interconnected links movably mounting the working head to the support, and
means for measuring the angular relations between adjacent ones of said links to provide a set of measured values that collectively define the direction to be measured, said pivotally interconnected links comprising a first link pivotally mounted to the support, a second link connected to the working head, and a plurality of intermediate links pivotally connected to and between said first and second links about at least three different axes, whereby the working head is mounted to the support for at least five degrees of rotational freedom.

25. A measuring instrument comprising
a support,
a working head adapted to be aligned in a measuring direction having a fixed angular relation with respect to a direction that is to be measured, a plurality of pivotally interconnected links movably mounting the working head to the support, and
means for measuring the angular relations between adjacent ones of said links to provide a set of measured values that collectively define the direction to be measured, said working head including a contact portion adapted to engage an object of which a direction is to be measured, and further including means for indicating when the contact portion is in engagement with said object.

26. The instrument of claim 25 wherein said contact portion comprises a plurality of mutually spaced contact elements fixed to the working head and positioned to collectively define a direction having a fixed angular relation relative to the working head.

27. The instrument of claim 26 wherein said contact elements comprise a plurality of mutually spaced and mutually insulated electrically conductive contacts.

28. A measuring instrument comprising
a support,
a working head adapted to be aligned in a measuring direction having a fixed angular relation with respect to a direction that is to be measured, a plurality of pivotally interconnected links movably mounting the working head to the support, and
means for measuring the angular relations between adjacent ones of said links to provide a set of measured values that collectively define the direction to be measured, said means for measuring angular relations between said links comprising means for generating angle signals respectively representing the angular position of each of said links relative to an adjacent link, a multiplexor responsive to said angle signals and having an output channel in which the angle sinals sequentially appear, a digital converter responsive to said multiplexor output channel, an accumulator, and means for seqentially gating the output of said converter into said accumulator whereby said accumulator will continuously store the values of said angles as the several links are moved to angularly position the working head.

29. The instrument of claim 28 including means responsive to occurrence of at least one of a group of conditions related to said working head for reading from said accumulator values of the angles contained therein.

30. The instrument of claim 29 wherein one of said conditions comprises the attainment by said working head of said measuring direction.

31. The instrument of claim 29 wherein one of said conditions comprises an operator's read out command.

32. The instrument of claim 29 wherein one of said conditions comprises a condition of substantially zero velocity of said working head.

33. The instrument of claim 29 including means responsive to the angle values contained in said accumulator for computing direction angles of said direction to be measured, as expressed in a reference coordinate system.

34. The instrument of claim 33 including means for establishing a reference direction relative to said support, and means for resetting said accumulator when said working head is moved to a position having a fixed angular relation to said reference direction.

35. The method of measuring direction in three dimensions of a line having a known angular relation to an object comprising the steps of:
angularly displacing a working head in three dimensions from a reference direction about a plurality of mutually angulated axes of rotation until the working head is translated and rotated to attain a measuring position having a predetermined angular relation to the object, and measuring the angular displacements of the working head about each of said axes.

36. The method of claim 35 including the step of sensing attainment of said measuring position by said working head, and thereupon providing an indication of the angular displacements of the working head about said axes.

37. The method of claim 35 including the step of positioning said working head in said reference direction.

38. The method of measuring direction of a line having a known angular relation to an object comprising the steps of:
angularly displacing a working head from a reference direction about a plurality of axes of rotation until the working head is translated and rotated to attain a measuring position having a predetermined angular relation to the object, and
measuring the angular displacements of the working head about each of said axes, said first mentioned step including angularly displacing the working head about at least five mutually independent axes.

39. The method of measuring direction of a line having a known angular relation to an object comprising the steps of:
angularly displacing a working head from a reference direction about a plurality of axes of rotation until the working head is translated and rotated to attain a measuring position having a predetermined angular relation to the object, and
measuring the angular displacements of the working head about each of said axes, including the step of restraining motion of the working head that does not occur as a rotation about at least one of said axes of rotation.

40. The method of measuring direction of a line having a known angular relation to an object comprising the steps of:
angularly displacing a working head from a reference direction about a plurality of axes of rotation until the working head is translated and rotated to attain a measuring position having a predetermined angular relation to the object, and
measuring the angular displacements of the working head about each of said axes, said first mentioned step including displacing the working head about said axes until it attains a position with both a measuring direction and location having a predetermined relation to a vector that is fixed with respect to the object.

41. The method of claim 40 including means responsive to said measured angular displacements of the working head about said axes for defining both position and direction.

42. A measuring instrument comprising
a work table,
a column fixed to the work table and upstanding therefrom,
a first link mounted to said column for rotation about a first axis aligned with the axis of said column,
a first angle sensor connected to be operated by rotation by said first link,
a second link pivoted to said first link for rotation about a second axis angularly related to axis of said first link,
a second angle sensor connected to be operated by rotation of the second link about said second axis,
a third link provided to said second link for rotation about a third axis angularly related to the axis of said second link,
a third angle sensor connected to be operated by rotation of said third link about said third axis,
a fourth link mounted to said third link for rotation about a fourth axis aligned with the axis of said third link,
a fourth angle sensor connected to be operated by rotation of said fourth link about said fourth axis,
a fifth link pivoted to said fourth link for rotation about a fifth axis angularly related to said fourth axis,
a fifth angle sensor connected to be operated by rotation of the fifth link about said fifth axis, and
a working head carried by said fifth link, said working head having alignment means that has a fixed angular relation to said fifth link.

43. The measuring instrument of claim 42 wherein said working head includes means for signaling attainment by said working head of a direction having a fixed angular relation relative to a direction to be measured.

44. The measuring instrument of claim 42 wherein said alignment means includes a plurality of mutually spaced contact elements adapted to simultaneously contact an object of which a direction is to be measured so as to position the working head in a known angular relation relative to the object.

45. The instrument of claim 42 including means for mounting said working head to said fifth link for rotation about a swivel axis fixedly related to said link and for restraining motion of said working head relative to said fifth link about axes angularly related to said swivel axis.

46. An instrument for measuring a vector in three dimensions comprising a support, a working head having a direction axis, means for mounting said working head to said support with an orientation that is variable in three dimensions, whereby said direction axis may be positioned in a known relation to the vector to be measured, and means for providing a set of values that collectively define the orientation of said direction axis in three dimensions.

47. The instrument of claim 46 wherein said means for mounting said working head comprises a plurality of pivotally interconnected link means for mounting said head to said support for rotation about a plurality of mutually angulated axes.

* * * * *

UNITED STATES PATENT OFFICE
CERTIFICATE OF CORRECTION

PATENT NO. : 3,944,798
DATED : March 16, 1976
INVENTOR(S) : Homer L. Eaton

It is certified that error appears in the above-identified patent and that said Letters Patent are hereby corrected as shown below:

IN THE ABSTRACT, line 1, change "inn" to --- in ---.

Column 3, line 65, change "strights" to --- straights ---.

Column 4, line 2, change "strights" to --- straights ---; line 22, change "fourth-axis" to --- fourth axis ---; line 51, change "stright" to --- straight ---; and line 52, change "stright" to --- straight ---.

Column 5, line 4, after "is" insert --- with ---.

Column 6, line 38, change "represnts" to --- represents ---; line 48, delete the first letter [n]; and line 56, change "coordinated" to --- coordinate ---.

Column 7, line 28, change second "$\beta''''$" to --- $\alpha'''$ ---; line 30, first character should be inserted --- $\chi''$ ---; lines 40, 41, 42, 43, and 44, all "L" should be capitals not in italics; line 45 beginning with "Now" start at the margin; line 48 beginning with first "y' " start at the margin; line 48 beginning with "z''' " start at the margin; and line 51 change "h" to an italic --- $h$ ---.

UNITED STATES PATENT OFFICE
CERTIFICATE OF CORRECTION

PATENT NO. : 3,944,798
DATED : March 16, 1976
INVENTOR(S) : Homer L. Eaton

It is certified that error appears in the above-identified patent and that said Letters Patent are hereby corrected as shown below:

Column 8, line 6, change small letter "x" to italic --- $x$ ---; line 8, change small letter "y" to italic --- $y$ ---; and line 11, change small letter "z" to italic --- $z$ ---.

Column 10, line 64, change "dispaceable" to --- displaceable ---.

Column 11, line 15, after utilization insert --- , ---; and line 55, change "though" to --- through ---.

Column 12, line 19, after the period change "the" to --- The ---.

Column 15, line 59, change "simplier" to --- simpler ---.

Column 17, line 13, change "analagous" to --- analogous ---.

Column 19, line 54, delete the last [o] before the hyphen.

Column 20, line 21, after "measured," start a new paragraph.

Column 21, line 6, change "sinals" to ---signals ---; and line 46, after "and" start back at the margin.

Column 22, line 43, after "to" insert --- the ---; line 47, delete [provided] and insert --- pivoted ---.

Signed and Sealed this

Sixth Day of July 1976

[SEAL]

Attest:

RUTH C. MASON
*Attesting Officer*

C. MARSHALL DANN
*Commissioner of Patents and Trademarks*